United States Patent [19]

Deutsch et al.

[11] Patent Number: 4,807,130
[45] Date of Patent: Feb. 21, 1989

[54] SERVO CONTROL SYSTEM FOR TRANSMISSION SHAFT SPEED CONTROL

[75] Inventors: Robert W. Deutsch, Sugar Grove; Frank Karim, Hanover Park, both of Ill.

[73] Assignee: Motorola, Inc., Schaumburg, Ill.

[21] Appl. No.: 946,736

[22] Filed: Dec. 24, 1986

[51] Int. Cl.⁴ .................... F16H 3/00; B60K 20/00
[52] U.S. Cl. .................... 364/424.1; 74/866; 74/861; 192/0.076; 192/0.032
[58] Field of Search .............. 364/161, 183, 424.1, 364/426, 165; 74/861, 866; 192/0.032, 0.052, 0.076, 0.092; 180/247

[56] References Cited

U.S. PATENT DOCUMENTS

| | | | |
|---|---|---|---|
| 4,413,714 | 11/1983 | Windsor | 192/0.033 |
| 4,419,729 | 12/1983 | Krieder | 364/426 |
| 4,498,036 | 2/1985 | Salemka | 364/183 |
| 4,638,898 | 1/1987 | Braun | 192/0.076 |
| 4,718,012 | 1/1988 | Oshiage | 74/866 |
| 4,727,472 | 2/1988 | Deutsch et al. | 364/183 |

Primary Examiner—Parshotam S. Lall
Assistant Examiner—Ellis B. Ramirez
Attorney, Agent, or Firm—Robert J. Crawford

[57] ABSTRACT

Disclosed is an electronic shaft synchronization system. The system employs a proportional integral controller for controlling the speed offset between two shafts approaching synchronization. The speed offset is determined by calculating an error signal representative of the shaft speed differences. Means for measuring the quality of the error signal is provided to allow the integrator to be initialized once the error signal reaches a first threshold. By initializing the integrator in this manner, the typical delay problem experienced with such integration is alleviated to allow a substantially faster synchronization between the shafts.

10 Claims, 4 Drawing Sheets

SERVO CONTROL SYSTEM FOR TRANSMISSION SHAFT SPEED CONTROL

BACKGROUND OF THE INVENTION

The present invention is related to servo control systems, and more particularly to such systems useable in electronic transmission shaft speed control systems.

In electronic transmission control systems, particularly systems designated as synchronized transmission systems, such as U.S. Pat. No. 4,329,885, for example, it is known that implementing a specific gear coupling between a drive shaft and a driven shaft is best accomplished when these shafts are being synchronously rotated at the predetermined angular speeds of rotation which are to be implemented by the selective gear to be coupled therebetween. In other words, prior to implementing a gear driving coupling between a drive shaft and a driven shaft, control is implemented such that the shafts are already rotating at the desired relationship between the shafts prior to implementing the gear coupling therebetween. Such systems are sometimes referred to as synchronized transmission systems, and examples of such systems and the components thereof are illustrated in U.S. Pat. Nos. 3,478,851, 4,430,911, 4,495,837, 4,495,839 and 4,329,855, the disclosures of which are incorporated by reference.

In prior electronic transmission control systems, it has typically been a problem in rapidly having the drive and driven shafts obtain the desired speed relationship therebetween which is necessary prior to the implementation of the desired gear coupling between the two shafts. Typically either a slow rise time for controlling the increase of one of the shafts, a slow fall time for decreasing the angular speed of one of the shafts, or a substantial overshoot in obtaining the desired end steady state speed of one of the shafts was encountered. While various techniques were proposed to speed-up the transient response of the entire system while minimizing the amount of overshoot in shaft speed control, the proposed solutions were either complex, costly or did not provide a sufficiently rapid transient response.

SUMMARY OF THE INVENTION

An object of the present invention is to provide an improved servo control system which is useable for controlling shaft speed in an electronic transmission control system.

Another object of the present invention is to provide an electronic transmission control system for synchronizing two shafts utilizing an improved servo control system for shaft speed control.

In one embodiment of the present invention an electronic shaft synchronization system is provided. The electronic shaft synchronization system comprises: input shaft means for providing an input shaft driven at an angular speed $w_1$; output shaft means comprising an output shaft capable of being selectively driven by the input shaft means at an angular speed of $w_2$; and electronic transmission means selectively coupling the input shaft to the output shaft in accordance with a plurality of predetermined selectable angular speed ratios between the speeds of $w_2$ and $w_1$. Additionally, the electronic transmission means includes transmission control means for monitoring the input shaft speed $w_1$ and the output shaft speed $w_2$ and controlling at least one thereof.

The control means implements one of the selectable speed ratios by providing a predetermined coupling between the input shaft and the output shaft in response to the monitored angular speeds of the shafts having a predetermined relationship therebetween.

The transmission control means includes a servo control loop having: subtraction means for receiving electrical signals related to the shaft speed $w_1$ and the output shaft speed $w_2$, error means for providing an error difference signal e in response thereto, integrator means for integrating the error signal and means for developing at least one control signal in response to the error signal e for controlling the speed of the one of said shafts so as to minimize the error signal.

The transmission control means further includes means for determining the status of the error signal and means for initializing the integrator means to a predetermined value once said error signal is determined to exceed a first predetermined quality threshold. The predetermined value is determined from previous integrations. The condition integrator is preferably initialized when that the rate of change of the error signal be approximately equal to zero and the error signal becomes less than a predetermined magnitudinal threshold.

These features of the present invention, as well as others, can best be understood by reference to the following description of the present invention.

DESCRIPTION OF THE PREFERRED EMBODIMENTS

Figure 1A:
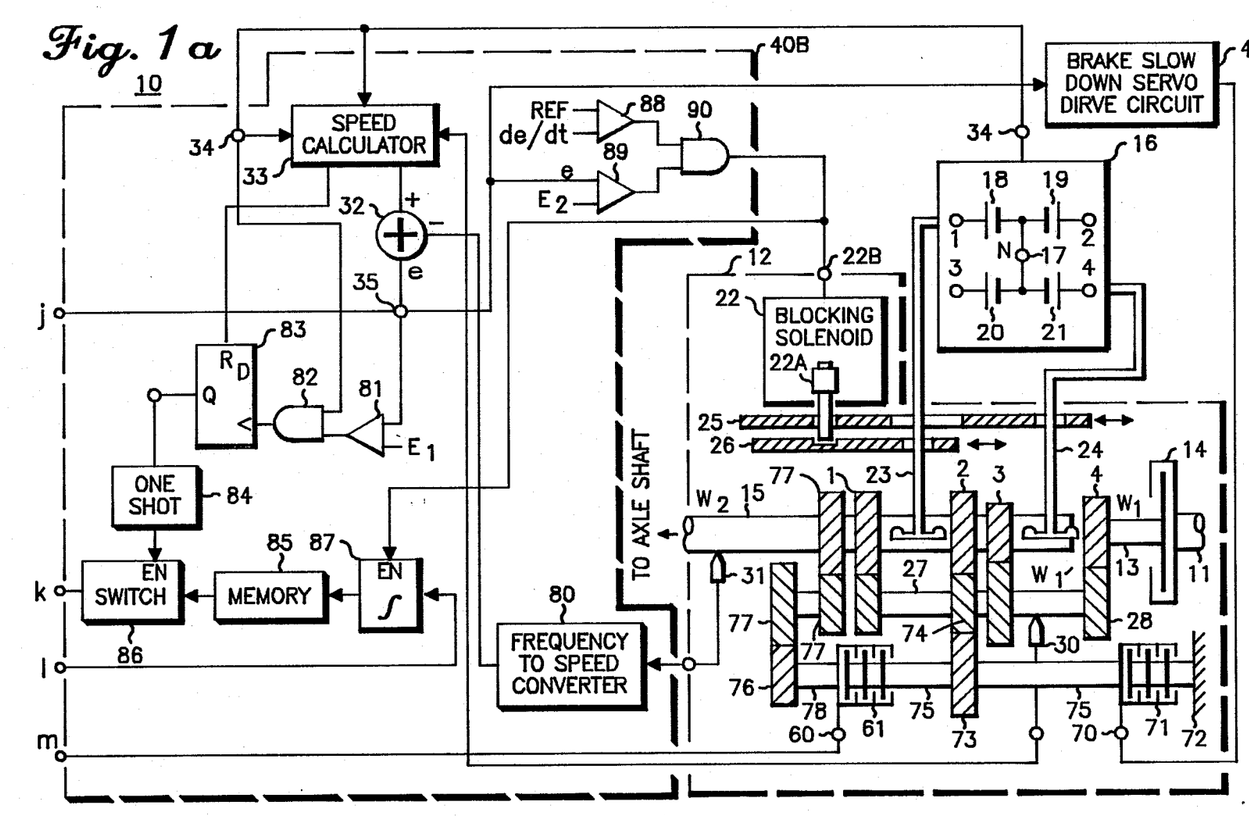
FIGS. 1a and 1b comprise a schematic and block diagram of an electronic transmission control system which includes a servo control loop.
Figure 1B:
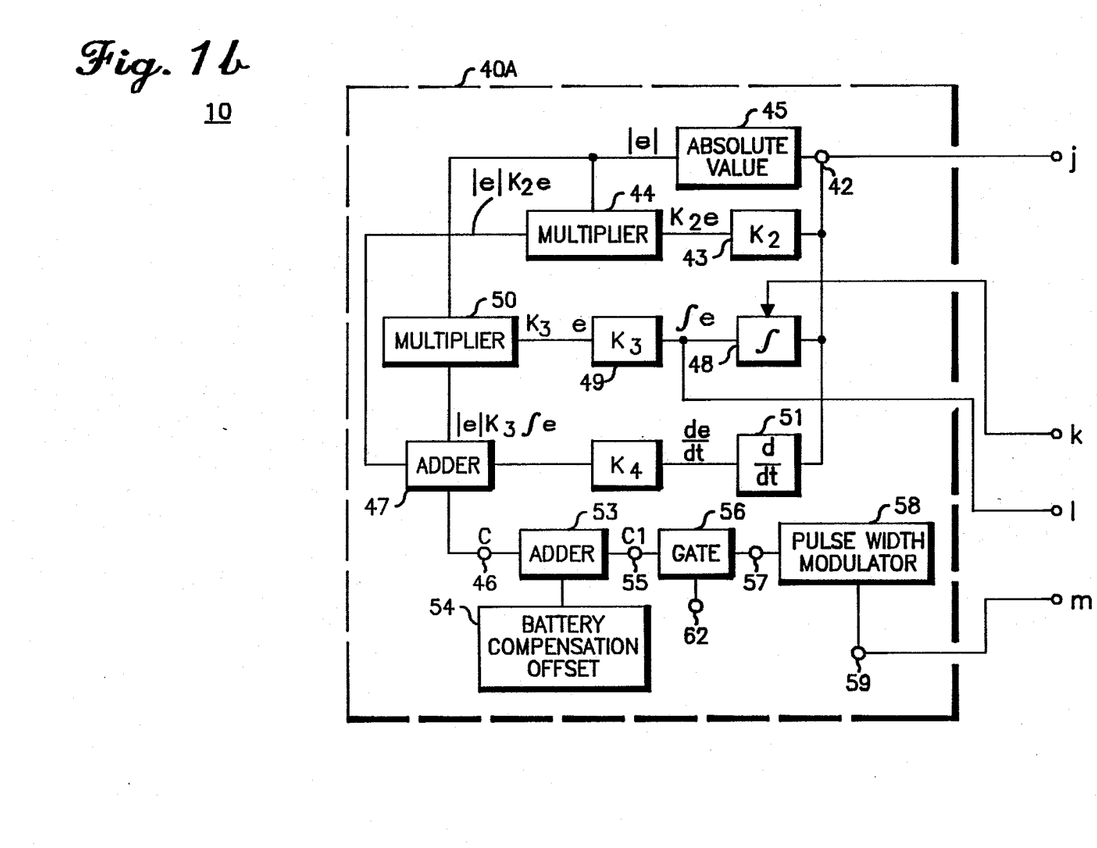

Referring to FIGS. 1a and 1b, an electronic transmission control system 10 is illustrated and is intended for operation in conjunction with a vehicle engine. The system 10 is utilized to provide selective gearing between an engine crankshaft 11 and a vehicle axle shaft (not shown) by virtue of mechanical couplings implemented in a transmission control box 12 (shown dashed in FIG. 1a). In the present case a transmission input drive shaft 13 is coupled to the engine crankshaft 11 by a conventional masterclutch 14, comprising either a friction clutch and/or a fluid coupling, which is responsive to the vehicle clutch pedal. A transmission output shaft 15 is drivingly coupled to a vehicle axle shaft by a differential and/or a transfer case (not shown). Essentially the transmission control box 12 is responsive to a manual shift control apparatus 16, shown schematically in FIG. 1a, which includes a manual gear shift lever (knob) 17 selectively movable between a neutral position N and positionable at locations 1-4 corresponding to the selection of transmission gears for first, second, third or fourth gear. The shift control apparatus 16 and transmission control box 12 select and implement desired gear ratios between the transmission input drive shaft 13 and the transmission output shaft 15. Such a general transmission apparatus as described above, can comprise the well known twin countershaft, constant mesh type transmission illustrated in U.S. Pat. Nos. 3,105,395, and 3,500,695, the disclosures of which are incorporated by reference herein.

Any movement of the manual shift lever 17 between any of the first through fourth gears (1-4) and the neutral gear, results in closing, at least momentarily, switch contacts associated with transmission switches 18 through 21, respectively, which are illustrated schematically within the manual shift control apparatus 16. Each of the switches 18 through 21 will change its state as the manual shift lever 17 moves from neutral to some other gear, such as third gear, for example. When the manual shift lever 17 has completed its travel the switch which had changed its state during gear switching will have resumed its prior state. It is contemplated that the switching signals provided by the switches 18 through 21 will, in general, control the operation of a blocking solenoid 22 in a manner to be subsequently described. These switching signals comprise gear select signals indicative of what gear is to be selected. A 1st/2nd gear jaw clutch select rail 23 and a 3rd/4th gear jaw clutch select rail 24 extend from the control apparatus 16 to the transmission box 12. Each of the select rails is horizontally moveable in response to appropriate movement of the shift level 17 so as to selectively couple any one of the gears 1-4 shown in FIG. 1a to the transmission output shaft 15. In FIG. 1a transmission box 12 is shown in neutral such that none of the gears 1-4 is coupled in driving relationship to the output shaft 15. Clutch select rail 23 can selectively couple either gear 1 or 2 to output shaft 15, while select rail 24 can couple either gear 3 or 4 to the output shaft.

The solenoid 22, as shown in FIG. 1a, includes an extending projection 22A which can be vertically withdrawn. The solenoid is effectively coupled to each of the select rails 23 and 24 via horizontally moveable linkages 25 and 26. With the configuration shown in FIG. 1, the blocking solenoid 22 and linkages 25 and 26 will prevent any movement of the select rails 23 or 24 from neutral position so as to couple any of the gears 1-4 to the output shaft 15 unless the projection 22A is vertically withdrawn. Thus gear coupling to the shaft 15, from neutral, is inhibited until solenoid actuation, or deactuation, withdraws projection 22A. The solenoid 22 and shift mechanisms 23, 24, 25 and 26 are only schematically illustrated in FIG. 1a, since many equivalent mechanisms are known and can be utilized. It should also be noted that European patent publication EP127949 illustrates a prior system providing gear select signals similar to those provided by control apparatus 16 and the switches 18-21 in response to movement of a gear shift knob or lever.

It is contemplated that in shifting from third gear to neutral, for example, acuation of the vehicle transmission (clutch) foot pedal (not shown) occurs first and this results in the clutch 14 disengaging the engine crankshaft from the transmission input shaft 13. Then the shift lever 17 is moved from position 3 to the neutral position N and this results in right side movement of select rail 24 to the neutral position illustrated in FIG. 1a, thereby decoupling gear 3 from shaft 15. When the manual shift knob 17 is now moved so as to attempt to select a new non neutral gear, one contact of one of the switches 18 through 21 will be closed by movement of the lever 17 indicating the attempted selection of another gear. However, until an appropriate relationship is established between the input transmission shaft 13, rotating at a predetermined angular speed $w_1$, and the output shaft 15 rotating at a speed $w_2$, the blocking solenoid 22 will prevent the select rails 23-24 from coupling any of the first through fourth gears (1, 2, 3, or 4) between the input drive shaft 13 and the output shaft 15. In addition, the solenoid blocks further movement of the lever 17 into one of the position 1-4. In FIG. 1a, the first through fourth gears associated with the manual shift lever 15 positions 1-4, representing first through fourth gears, are identified by the reference numerals 1 through 4. Essentially, the blocking solenoid remains energized, preventing coupling a new gearing between the input shaft 13 and the output shaft 15, via the shift mechanisms 23-24, until a signal at a control terminal 22B releases the solenoid. This control signal is provided when desired synchronization is achieved between the shafts 13 and 15.

Essentially, when manually shifting from neutral to another gear, one contact of one of the switches 18 through 21 is closed indicating that a specific gear selection is desired. However, implementation of this gearing is prevented by the blocking solenoid 22 until a single or twin countershaft 27 is being rotated at a predetermined angular speed $w_1'$ which has predetermined relationship with respect to the transmission output shaft speed $w_2$. The countershaft 27 is coupled to the transmission input drive shaft 13 by a fixed gear coupling 28, which includes gear 4, such that the countershaft angular speed $w_1'$ has a fixed predetermined relationship to the input drive shaft speed $w_1$. This therefore means that effectively coupling a gearing between the input shaft 13 and the output shaft 15 is prevented until appropriate synchronous rotation of these shafts has first been achieved. This general type of operation has been achieved in prior electronic transmission control systems, but the prior systems have typically provided too long of a transient time in implementing the proper speed relationship between the countershaft 27 and the output shaft 15 before permitting gear engagement. This is very objectionable to the driver of the vehicle who must wait for synchronism to occur prior to completing the desired gear shifting. The present invention minimizes this transient delay in the following manner.

Since the present invention is concerned with providing effective synchronism between the rotation of the input shaft 13 (the countershaft 27) and the output shaft 15, the angular rotation speeds of the countershaft 27 and transmission output shaft 15 are each sensed by separate speed sensors 30 and 31, respectively. In general, the input shaft 13 is considered to be rotated at an engine speed $w_1$ while the countershaft 27 is rotated at an angular speed $w_1'$ which has a fixed relationship to the speed $w_1$ determined by the coupling 28. The output shaft 15 is normally selectively drivingly rotated at a speed $w_2$ by the input shaft 13 being coupled to shaft 15 by one of the gears 1-4. The relationship between $w_2$ and $w_1$ depends on the gear coupling selectively provided by the gears 1-4.

Each of the sensors 30 and 31 can comprise magnetic sensors sensing the passage of rotating teeth on each of the desired shafts whose speed is desired to be monitored (sensed). In addition, the sensors can include integrating means for developing analog signals related to the shaft speed of the associated shafts. Alternatively, each of the sensors 30 and 31 can just produce periodic pulses, with a computer or microprocessor further processing these pulses to derive the appropriate angular speed information. In any event, the output shaft speed $w_2$ sensed by the sensor 31 is provided as an input to a subtraction apparatus 32 which receives an additional input from a speed calculator circuit 33 that receives one input from the sensor 30 and has an additional input terminal 34 which receives input signals from the manual shift control apparatus 16.

Essentially, when the manual shift lever 17 is moved from neutral to select the implementing of a particular gear, one contact of one of the switches 18 through 21 is closed, and this provides a signal which indicates which gear is to be selected. This gear selection signal caused by the closure of one of the switches is the signal received at the terminal 34 by the speed calculator circuit 33. For each gear to be selected, it is known what type of relationship must exist between the input drive shaft speed $w_1$ and the output shaft speed $w_2$ in order to provide synchronism between the output shaft 15 and countershaft 27 (or input shaft 13) prior to the implementing of the selected gear coupling to be provided therebetween. The function of the speed calculator 33 is to select an appropriate multiplier factor $K_1$ which effectively multiplies the input shaft angular speed $w_1$ (the countershaft speed $w_1'$) by the factor $K_1$ and provides this term as a desired speed input to the subtraction means 32 which receives as its other input the output shaft speed $w_2$. The difference between these two speeds is provided as an error signal e by the subtraction means 32 at an output terminal 35. The error signal e represents the difference between the actual sensed output shaft speed $w_2$ and the desired countershaft speed $K_1(w_1')$ which is needed for shaft synchronism for the gear coupling to be implemented.

When synchronism is achieved, the magnitude of the error signal e will typically be substantially zero, but initially a substantial magnitude for this signal will exist indicating the nonsynchronization of the input shaft 13, and/or countershaft 27, with respect to the output shaft 15 for the gearing which is to be implemented. The present invention involves the processing of this error signal e so as to effectively control the speed of the countershaft 27 and input shaft 13 so as to rapidly bring them into synchronization with the output shaft 15 to thereby permit the implementation of the proper gearing by the gears 1 through 4. The manner in which the jaw clutch select rails 23 and 24 physically contact the gear members 1 through 4 and the output shaft 15 to implement the desired gear selection is not of particular concern to the present invention, and such mechanisms are well known to those skilled in the art and are illustrated in several of the transmission patents previously referred to. However, a significant feature of the present invention deals with the manner of processing the error signal e by circuitry in a servo control loop so as to obtain improved performance for the control system 10.

Essentially, a proportional integral control circuit 40a (shown dashed in FIG. 1b) receives the error signal e at the terminal 42 as one of its inputs, while a brake, or slow down, servo control drive circuit 41 receives this same signal via a similar circuit (not shown). Details of the brake servo control circuit 41 are not shown since this circuit is substantially similar to the control circuits 40a and 40b, wherein the main difference resides in different multiplication factors being applied to various terms of the control signal produced by the brake circuit 41 as opposed to the control signal provided by proportional integral circuit 40a. The operation of the proportional integral circuit 40a will now be discussed in detail.

The proportional integral circuit 40a includes an input terminal 42 at which the error signal e is provided. This terminal is coupled through a multiplier stage 43 which multiplies the error signal e by a factor $K_2$ and provides an output signal $K_2(e)$ as an input to a multiplier stage 44. The terminal 42 is also coupled as an input to an absolute value circuit 45 which effectively calculates the absolute value of the magnitude of the signal e and provides this absolute value signal also as an input to the multiplier circuit 44. The output of the absolute value circuit 45 is essentially a multiplier M equal to the absolute value of $e^x$, with e being the error signal e and x being equal to one. The output of the multiplier circuit 44 represents the square of the error signal having the same polarity as the error signal e and multiplied by $K_2$. This signal is a first term of a composite control signal C to be provided at an output terminal 46 by an adder circuit 47 which receives this first signal term. The terminal 42 is also coupled to integrator circuit 48 which provides the integrated output of the signal e to a multiplier circuit 49 which multiplies the integral of signal e by a constant $K_3$. A second input to the integrator circuit 48 (other than the error signal e) provides an essential part of the invention and will be subsequently discussed with the control circuit 40b (shown in dashed lines). The output of the circuit 49 is provided as an input to a multiplier stage 50 which receives the absolute value signal as one input and provides a second term of the control signal C comprising the product of $K_3$, the integral of the signal e and the absolute value of the signal e. In addition, preferably a derivative circuit 51 and a multiplier circuit 52 having a factor $K_4$ are provided wherein these elements provide an input to the adder 47 comprising a third term of the control signal C equal to the product of $K_4$ and the derivative of the signal e.

The signal C at the terminal 46 is a servo control signal having a first proportional term effectively varying as the square of the signal e, an integral term which is also multiplied by the absolute value of the signal e and a derivative term. The signal C is provided as an input to an adder circuit 53 which receives an additional input from a battery compensating offset circuit 54 such that a composite control signal Cl is provided at an output terminal 55. The signal Cl includes a constant related to battery voltage such that the control signal Cl will take into account differences in battery voltage and compensate for these variations. The control signal Cl is provided as an input to a gate 56 which, when closed, will pass the signal Cl to a terminal 57 that provides a control input to a pulse width modulation circuit 58 that provides an output at a terminal 59 that is coupled to a control terminal 60 of a variable slip clutch 61. A control terminal 62 of the gate 56 controls the opening and closing of the gate wherein the gate 56 will be closed so as to permit the passage of the signal Cl whenever the manual shift control apparatus 16 indicates that a desired shift in gearing is to occur but has not yet been accomplished. This desired shifting can be determined by the closure of one of the contacts of the switches 18 through 21 while another contact of this switch has not yet been closed.

The operation of the brake (slow down) servo control drive circuit 41 is essentially similar to that of the proportional integral drive circuit 40a and the control circuit 40b wherein the output of the circuit 41 is provided to a control terminal 70 of a brake slip clutch 71 coupled between a fixed chassis 72 (serving as a brake) and a shaft 75 coupled by gears 73 and 74 to countershaft 27. In a similar manner, the slip clutch 61 provides a controlled variable speed coupling between a gear 76, coupled through a fixed speed-up gearing 77 to the output shaft 15, and its shaft 78 to the gear 73 coupled to the countershaft 27.

The control circuit 40b provides the error signal e for the proportional integral controller 40a, it controls the blocking solenoid 22, and it controls the second input to the integrator circuit 48. The speed calculator 33, in conjunction with a frequency to speed converter 80 and an adder 32, is used to generate the error signal at terminal 35. The speed calculator 33 receives a frequency signal from the sensor 30 and converts it to a shaft speed. This speed is the speed to which the output shaft 15 must be synchronized. The signal at the terminal 34 is received by the speed calculator 33 in order to determine when to initiate this synchronization process.

The frequency to speed converter 80 receives a frequency signal from the sensor 31, indicating the rotation of the shaft 15, and converts this signal to one representing the actual speed of the output shaft 15. The output of the converter 80 is added with the speed output signal of the speed calculator 33 at the adder circuit 32. The adder circuit 32 generates the error signal e representing the difference in frequency required to synchronize the shaft 15 with the shaft 30.

The control circuit 40b employs the error signal e in two different paths. The first path involves controlling the second input to the integrator circuit 48. The second input is provided to the integrator circuit 48 so that the integrator value used in the integration (a voltage level in an analog circuit or a stored memory value in a microprocessor implementation) may be instantaneously changed so as to overcome delay problems which would otherwise be encountered in synchronizing the shafts. In FIG. 1a, the value to which the integrator is changed is stored in a memory circuit 85 and enabled into the integrator circuit 48 through a switch 86.

The control system 10 monitors the error signal to determine when the second input to the integrator circuit 48 should be activated. Since the error signal e will continually be lessened in magnitude as the control system 10 attempts to synchronize the shafts, the system 10 waits until the error signal is less than a first threshold before activating this second integrator input. The first threshold is referred to as E1. Once the signal at terminal 34 indicates a gear change is desired, and the error signal e is determined to be less than the threshold E1, a shift pending signal is generated to indicate the first occurrence of this signal on this gear change attempt.

The shift pending signal is generated via a comparator 81, an AND gate 82 and a D flip-flop 83. The comparator 81 is used to indicate when the error signal e falls below the threshold E1, while the D flip-flop 83 is used to latch this condition. The D flip-flop 83 is reset by the speed calculator 33 whenever the gear shift lever reaches neutral.

The shift pending signal, generated at the output of the flip flop 83, is received by a monostable multivibrator (one-shot) 84 such that when the one-shot generates its pulsed output, the switch 86 enables the value stored in the memory 85 to enter the integrator circuit 48.

The output of the integrator circuit 48 is connected to a second integrator circuit 87. The integrator circuit 87 is used to store the average value of the integrator circuit 48 when the blocking solenoid 22 is released, as will be subsequently described.

The second path in which the control circuit 40b employs the error signal e involves the release of the blocking solenoid 22. After signal 34 indicates that a gear change is desired, two comparators 88 and 89, in conjunction with an AND gate 90 are used to release the blocking solenoid 22 when the error signal is less than a second threshold, E2 (E2<E1), and the rate of change of the error signal is approximately equal to zero. The comparator 89 is used to determine when the error signal falls below the second threshold E2, at which time the comparator 89 generates an active output signal which is received by the AND gate 90. The comparator 88 is used to determine when the rate of change (de/dt) of the error signal is approximately equal to zero. Once the rate of change, as indicated by the output of the integrator circuit 48, falls below the reference (REF) of the comparator 88 (set equal to approximately zero), the comparator 88 generates an active output signal. When the active output signal from the comparator 88 is AND'd with the active output signal from the comparator 89 by the AND gate 90, the AND gate 90 releases the blocking solenoid 22 to permit the desired gear change, while the shafts 15 and 30 are synchronized.

Figure 2:
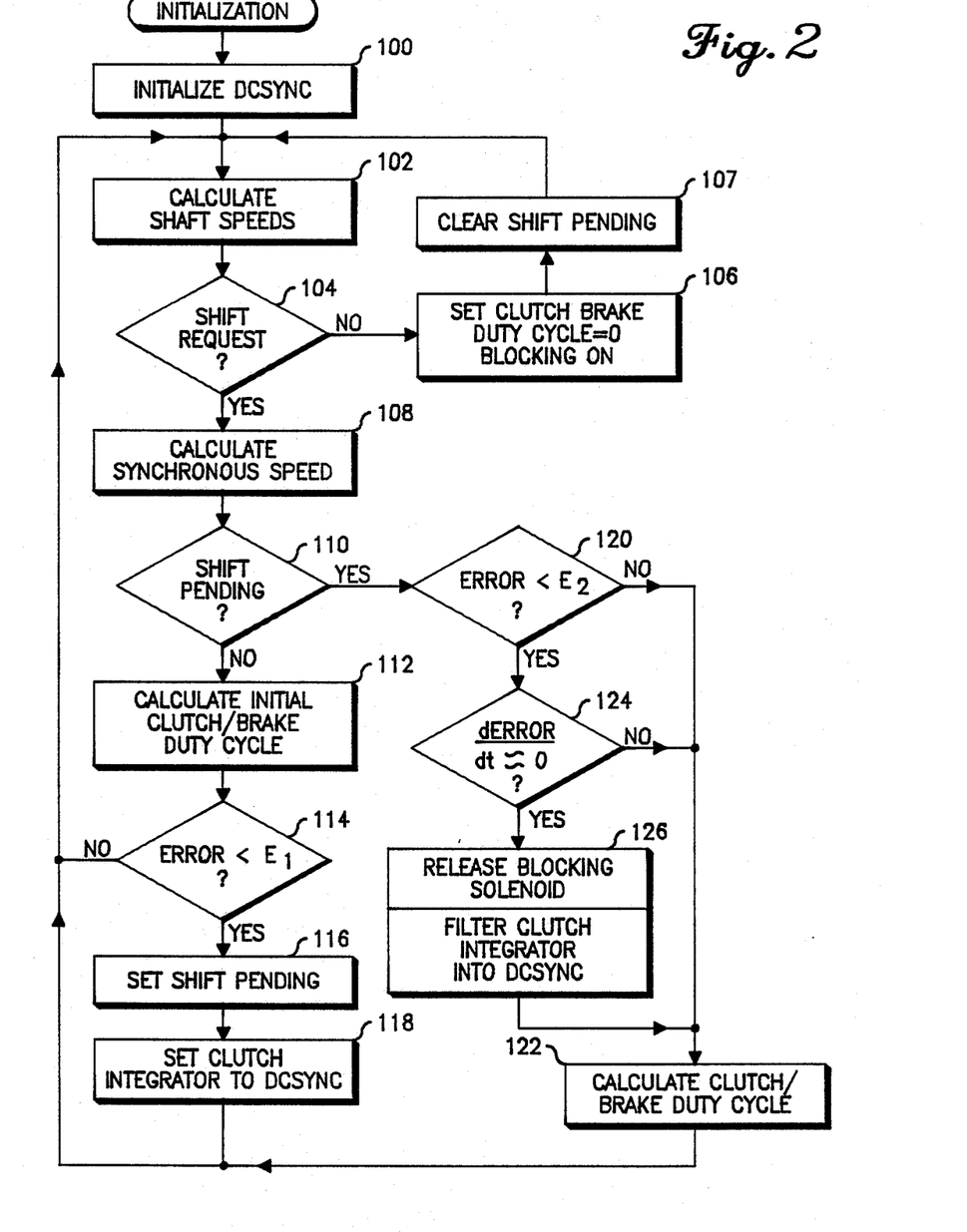
FIG. 2 is a flow chart representing the preferred transmission control steps implemented by the transmission control system illustrated in FIGS. 1a and 1b.

The operation of the electronic transmission control system 10 shown in FIGS. 1a and 1b can best be described by reference to the flow chart shown in FIG. 2 which depicts the major process steps which occur during the selection of a different transmission gear. The flowchart in FIG. 2 is entered at an initial point 100 designating an initialization of a value (DCSYNC) to be stored in memory 85 for the integrator circuit 48. Next, at block 102 the speeds of shafts 15 and 30 are respectively calculated by the frequency to speed converter 80 and the speed calculator 33.

At block 104, a test is performed to determine whether or not the signal 34 is indicative of a shift into a gear or a shift out of a gear, i.e., into neutral. This is readily apparent as two active signals are required from signal 34 for a shift from one gear to another. If the signal 34 indicates only a shift into neutral, flow proceeds to block 106 where the clutch/brake duty cycle is set to zero and the blocking solenoid 22 is energized. From block 106, flow proceeds to block 107 where the aforementioned "shift pending" signal is cleared. At which point, flow returns to block 102.

Once a gear shift has been requested (determined at block 104), flow proceeds to block 108 where the synchronous shaft speed for that gear is calculated. At block 110, a test is performed to determine whether or not the shift pending signal has yet been activated (set). As illustrated at block 116, the "shift pending" signal is set after the error signal e has been detected within the E1 range.

If the shift pending signal has not been set, flow proceeds to block 112 where the initial clutch/brake duty cycle is calculated. (At this point the system 10 is in the process of synchronizing the two shafts and the error signal e is being reduced in magnitude.) At block 114 one of several tests is performed to indicate the status (meaning "magnitude" and/or "rate of change") of the error signal. In this case, the test determines whether or not the error signal e has been reduced in magnitude to within the E1 range. If it has not, flow returns to block 102 for further processing of the synchronization. If the error signal is within the E1 range, flow proceeds to block 116 where the shift pending signal is set to indicate that the integrator circuit 48 has already been initialized. Then at block 118, the value which has been initialized into the memory circuit 85 is released into the integrator circuit 48 (via the one-shot 84). Flow then returns to block 102 for further processing of the synchronization.

Since the shift pending signal has been set, from block 102, the next pass through the flowchart of FIG. 2 will include sequential processing through blocks 104, 108, 110, and then block 120. At block 120, another test is performed to measure the status of the error signal e. In this case, the test determines whether or not the error signal e is within the E2 range. If it is, flow proceeds to block 122 where the clutch or brake duty cycle is calculated, as described in block 40a of FIG. 1b.

If the error signal e is less than E2, i.e., within the E2 range, flow proceeds from block 120 to block 124 where yet another test is performed to measure the status of the error signal e. In this case, the test determines whether or not the rate of change of the error signal is approximately zero. If not, flow proceeds to block 122 for further processing of the synchronization. If the error signal e satisfies this test, flow proceeds to block 126 where the blocking solenoid is released and DCSYNC is updated by integrating the output of integrator circuit 48 as described in FIGS. 1a and 1b. After releasing the blocking solenoid, flow returns to block 122 for further synchronization.

Figure 3:
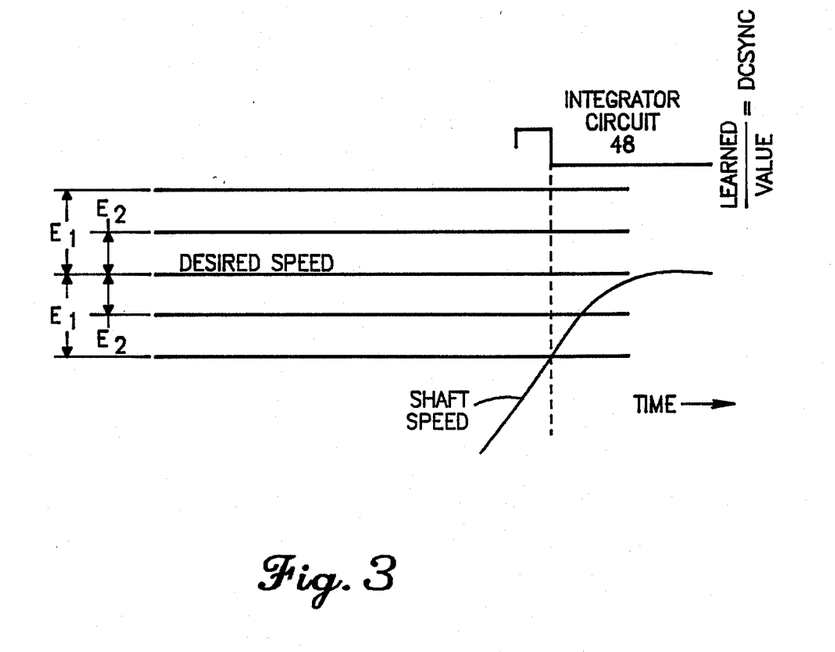
FIG. 3 is a timing diagram illustrating the synchronization timing according to the quality of the error signal discussed in the previous figures.

In FIG. 3, a plot of the speed of the controlled shaft (counter shaft 27) is shown as a function of time. The speed of the shaft 27 (FIG. 1a) and thresholds E1 and E2 are shown as ranges (band) in the vertical direction. Note that when the speed of the controlled shaft indicates that the error signal e has traversed the E1 threshold, the integrator circuit 48 is initialized to the value presently stored in DCSYNC and, in response thereto, the error signal diminishes and the shaft speed quickly reaches the desired speed without overshooting.

One advantage of the present invention resides in the reinitialization of the integral terms of the control signal C. This has been found to improve the delay problem typically inherent in most proportional integration controllers having stable damping response characteristics. Thus, the synchronization is accomplished with optimal response time. Additionally, since the two shafts are intercoupled only after the error signal is less than the E2 threshold and the rate of change of the error signal is approximately zero, control of the countershaft 27 is provided without experiencing the speed overshoot problems.

While specific embodiments of the present invention have been shown and described, further modifications and improvements will occur to those skilled in the art. Certainly the improved servo control loop, which minimizes the transient time for implementing changes in shaft speed for the countershaft 27 while minimizing overshoot, can be applicable to many other types of speed shaft controls and to other control systems not involving speed shaft control. Most, if not all, of the functions of the proportional integral circuit 40a can preferably be implemented by a microprocessor. The flow chart in FIG. 2 illustrates the general operation of such a programmed microprocessor. Also, instead of single countershaft 27, a pair of countershafts could be used, each associated with just one of the slip clutches 61 and 71. All such modifications which retain the basic underlying principles disclosed and claimed herein are considered within the scope of the present invention.

What is claimed is:

1. An electronic shaft synchronization system comprising:
    input shaft means for providing an input shaft driven at an angular speed $w_1$;
    output shaft means comprising an output shaft capable of being selectively driven by said input shaft means at an angular speed of $w_2$;
    electronic transmission means selectively coupling said input shaft to said output shaft in accordance with a plurality of predetermined selectable angular speed ratios between said speeds of $w_2$ and $w_1$;
    said electronic transmission means including transmission control means for monitoring said input shaft speed $w_1$ and said output shaft speed $w_2$ and controlling at least one thereof, said control means implementing one of said selectable speed ratios by providing a predetermined coupling between said input shaft and said output shaft in response to the monitored angular speeds of said shafts having a predetermined relationship therebetween;
    said transmission control means including a servo control loop having subtraction means for receiving electrical signals related to said shaft speed $w_1$ and said output shaft speed $w_2$, error means for providing an error difference signal e in response thereto, integrator means for integrating the error signal and means for developing at least one control-signal in response to said error signal e for controlling the speed of said one of said shafts so as to minimize said error signal;
    said transmission control means including error measuring means for determining the status of the error signal and means for initializing the integrator means to a predetermined value, which is at least in part determined from previous integrations, in response to said error measuring means indicating that said error signal exceeds a first predetermined quality threshold.

2. An electronic shaft synchronization system, according to claim 1, wherein said transmission means includes means for selectively decoupling said input and output shafts during implementing changes in the ratio between $w_1$ and $w_2$.

3. An electronic shaft synchronization system, according to claim 1, wherein said first predetermined quality threshold includes a value indicative of the magnitude of the error signal e.

4. An electronic shaft synchronization system, according to claim 1, wherein said input shaft is selectively coupled to an engine shaft by a master clutch and wherein said output shaft is coupled to an axle shaft.

5. An electronic shaft synchronization system, according to claim 4, which includes at least one electronically controllable slip clutch coupled between one of said engine and axle shafts and one of said input and output shafts, said slip clutch selectively providing a variable speed coupling therebetween in accordance with the magnitude of said control signal.

6. An electronic shaft synchronization system, according to claim 1, wherein said first predetermined quality threshold includes a value indicative of the rate of change of the error signal e.

7. An electronic shaft synchronization system, according to claim 6, wherein said value indicative of the rate of change of the error signal e is approximately zero.

8. An electronic shaft synchronization system comprising:
   input shaft means for providing an input shaft driven at an angular speed $w_1$;
   output shaft means comprising an output shaft capable of being selectively driven by said input shaft means at an angular speed of $w_2$;
   electronic transmission means selectively coupling said input shaft to said output shaft in accordance with a plurality of predetermined selectable angular speed ratios between said speeds of $w_2$ and $w_1$;
   said electronic transmission means including transmission control means for monitoring said input shaft speed $w_1$ and said output shaft speed $w_2$ and controlling at least one thereof, said control means implementing one of said selectable speed ratios by providing a predetermined coupling between said input shaft and said output shaft in response to the monitored angular speeds of said shafts having a predetermined relationship therebetween;
   said transmission control means including a servo control loop having subtraction means for receiving electrical signals related to said shaft speed $w_1$ and said output shaft speed $w_2$, error means for providing an error difference signal e in response thereto, integrator means for integrating the error signal and means for developing at least one control signal in response to said error signal e for controlling the speed of said one of said shafts so as to minimize said error signal;
   said transmission control means including error measuring means for initializing the integrator means to a value, which is at least in part determined from previous integrations, in response to said error measuring means indicating that said error signal is less than a magnitudinal threshold and that the rate of change of the error signal e is approximately zero.

9. An electronic shaft synchronization system comprising:
   input shaft means for providing an input shaft driven at an angular speed $w_1$;
   output haft means comprising an output shaft capable of being selectively driven by said input shaft means at an angular speed of $w_2$;
   electronic transmission means selectively coupling said input shaft to said output shaft in accordance with a plurality of predetermined selectable angular speed ratios between said angular speeds of $w_2$ and $w_1$;
   said electronic transmission means including transmission control means for monitoring said input shaft speed $w_1$ and said output shaft speed $w_2$ and controlling at least one thereof, said control means implementing one of said selectable speed ratios by providing a predetermined coupling between said input shaft and said output shaft in response to the monitored angular speeds of said shafts having a predetermined relationship therebetween;
   said transmission control means including a servo control loop having subtraction means for receiving electrical signals related to said shaft speed $w_1$ and said output shaft speed $w_2$, error means for providing an error difference signal e in response thereto, integrator means for integrating the error signal and means for developing at least one control signal in response to said error signal e for controlling the speed of said one of said shafts so as to minimize said error signal;
   said transmission control means including means for indicating when the rate of change of the error signal reaches a predetermined threshold to establish, at least in part, said predetermined relationship.

10. An electronic shaft synchronization system comprising:
    input shaft means for providing an input shaft driven at an angular speed $w_1$;
    output shaft means comprising an output shaft capable of being selectively driven by said input shaft means at an angular speed of $w_2$;
    electronic transmission mean selectively coupling said input shaft to said output shaft in accordance with a plurality of predetermined selectable angular speed ratios between said speeds of $w_2$ and $w_1$;
    said electronic transmission means including transmission control means for monitoring said input shaft speed $w_1$ and said output shaft speed $w_2$ and controlling at least one thereof, said control means implementing one of said selectable speed ratios by providing a predetermined coupling between said input shaft and said output shaft in response to the monitored angular speeds of said shafts having a predetermined relationship therebetween;
    said transmission control means including a servo control loop having combination means for receiving electrical signals related to said shaft speed $w_1$ and said shaft speed $w_2$, error means for providing an error difference signal e in response thereto, integrator means for integrating the error signal and means for developing at least one control signal in response to said error signal e for controlling the speed of said one of said shafts;
    said transmission control means including error measuring means for determining the status of the error signal and means for initializing the integrator means to a predetermined value, which is at least in part determined from previous integrations.

* * * * *